United States Patent
Bhatti (10) Patent No.: US 7,385,720 B2
(45) Date of Patent: Jun. 10, 2008

(54) SYSTEMS AND METHODS FOR SCHEDULING PRINT JOBS

(75) Inventor: Kristen L. Bhatti, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 900 days.

(21) Appl. No.: 10/010,641

(22) Filed: Nov. 5, 2001

(65) Prior Publication Data

US 2003/0086115 A1    May 8, 2003

(51) Int. Cl.
*G06F 15/00*    (2006.01)
*G06K 1/00*    (2006.01)

(52) U.S. Cl. .................. 358/1.15; 358/1.14; 358/1.16; 358/1.9; 358/468; 715/744; 715/400

(58) Field of Classification Search ............... 358/1.15, 358/296, 1.14, 1.13, 1.16, 1.9, 468; 715/500, 715/765, 744; 705/9, 8, 1; 347/5; 709/234, 709/217; 718/100, 106
See application file for complete search history.

(56) References Cited

U.S. PATENT DOCUMENTS

| | | | | |
|---|---|---|---|---|
| 5,465,354 A | * | 11/1995 | Hirosawa et al. | 718/106 |
| 5,471,564 A | * | 11/1995 | Dennis et al. | 358/1.15 |
| 5,528,375 A | * | 6/1996 | Wegeng et al. | 358/296 |
| 5,872,569 A | * | 2/1999 | Salgado et al. | 715/764 |
| 5,892,921 A | * | 4/1999 | Murakami et al. | 709/234 |
| 6,016,478 A | * | 1/2000 | Zhang et al. | 705/9 |
| 6,301,611 B1 | * | 10/2001 | Matsumoto et al. | 709/217 |
| 6,426,799 B1 | * | 7/2002 | Okimoto et al. | 358/1.15 |
| 6,449,055 B1 | * | 9/2002 | Okimoto et al. | 358/1.15 |
| 6,471,314 B2 | * | 10/2002 | Doi | 347/5 |
| 6,493,100 B1 | * | 12/2002 | Endo et al. | 358/1.14 |
| 6,587,126 B1 | * | 7/2003 | Wakai et al. | 715/744 |
| 6,587,861 B2 | * | 7/2003 | Wakai et al. | 715/209 |
| 6,667,810 B1 | * | 12/2003 | Jeyachandran et al. | 358/1.14 |
| 6,822,754 B1 | * | 11/2004 | Shiohara | 358/1.15 |
| 6,826,534 B1 | * | 11/2004 | Gupta et al. | 705/1 |
| 6,889,243 B1 | * | 5/2005 | Hondou et al. | 718/100 |
| 6,963,413 B2 | * | 11/2005 | Rahgozar et al. | 358/1.13 |
| 7,126,717 B2 | * | 10/2006 | Jeyachandran et al. | 358/1.9 |
| 7,187,478 B2 | * | 3/2007 | Mikame et al. | 358/468 |
| 2001/0046068 A1 | * | 11/2001 | Honda | 358/1.16 |
| 2004/0027601 A1 | * | 2/2004 | Ito et al. | 358/1.13 |
| 2004/0093254 A1 | * | 5/2004 | Hirata et al. | 705/8 |

FOREIGN PATENT DOCUMENTS

| | | | | |
|---|---|---|---|---|
| JP | 06092541 A | * | 4/1994 | |
| JP | 06195183 A | * | 7/1994 | |
| JP | 09146763 A | * | 6/1997 | |

* cited by examiner

*Primary Examiner*—Thomas D. Lee
*Assistant Examiner*—Satwant K Singh (57) ABSTRACT

Methods for print scheduling are provided. A representative method for print scheduling includes receiving user input identifying a time for printing a print job, and transmitting the print job to a printer at the time identified by the user input. Systems, computer-readable media, and other methods for print scheduling are also provided.

21 Claims, 9 Drawing Sheets

SYSTEMS AND METHODS FOR SCHEDULING PRINT JOBS

FIELD OF THE INVENTION

The invention is generally related to printing and, more particularly, is related to systems and methods for scheduling print jobs.

BACKGROUND OF THE INVENTION

In many work settings, it is common for a team of people to work together on a project that involves producing one or more project documents. In such a setting, one or more team members may be in charge of electronically editing a project document and another team member may be in charge of printing the document. The team member in charge of printing the document may be responsible for printing a final version of the document after the document is finalized but in time for copies to be made before a certain meeting or deadline. One problem in such a scenario is that the document may be mistakenly printed and copied prior to being finalized. Another problem is that printing may not be initiated in time for the document to be copied and distributed prior to the meeting or deadline. Even if multiple copies are not necessary, the printing of a lengthy document may need to commence significantly before a deadline in order for the document to be ready prior to the deadline. However, if the document is printed too early, then it may be incomplete or non-final.

One approach to printing the document at the right time may be for the team members to communicate with each other to determine the appropriate time to print the document. This approach may, however, be unreliable since there may be times when a team member may forget or be unable to establish communication with other team members. Therefore, it should be appreciated that there is a need for improved systems and methods that address these and/or other problems associated with printing a document.

SUMMARY OF THE INVENTION

Briefly described, the present invention provides systems and methods for scheduling print jobs. In one embodiment of the invention, a method for print job scheduling includes receiving user input identifying a time for printing a print job, and transmitting the print job to a printer at the time identified by the user input.

In another embodiment of the invention, a print scheduling system includes an input interface for receiving user input identifying a time for printing a print job and a processor that is programmed to initiate the transmission of the print job to a printer at the time identified by the user input.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the invention. Moreover, in the drawings, like reference numerals designate corresponding parts throughout the several views.

DETAILED DESCRIPTION OF THE PREFERRED EMBODIMENTS

As will be described in detail below, the present invention provides systems and methods for scheduling print jobs. In one embodiment of the invention, a method for print job scheduling includes receiving user input identifying a time for printing a print job, and transmitting the print job to a printer at the time identified by the user input.

Figure 1:
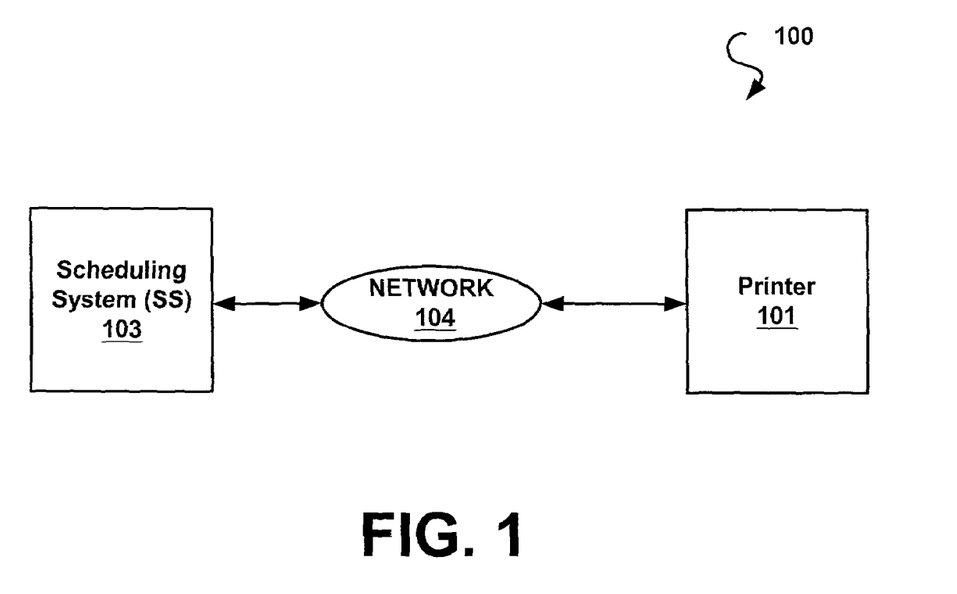
FIG. 1 depicts a printing system of the invention that features a scheduling system and a printer.

FIG. 1 depicts a non-limiting example of a printing system 100 of the invention that features a printer 101 and a scheduling system (SS) 103. The SS 103 may be a special or general purpose digital computer, such as a personal computer (PC; IBM-compatible, Apple-compatible, or otherwise), a workstation, a minicomputer, or a mainframe computer. The printer 101 may be, for example, a laser printer, an ink-jet printer, an impact printer, a solid-ink printer, or a multifunction device (MFD), etc. An MFD provides other functionality in addition to printing, such as, for example, scanning, faxing, and/or copying.

The printer 101 and the SS 103 may be coupled via a network 104. The network 104 may be any suitable network for connecting the printer 101 to the SS 103 such as, for example, a Local Area Network (LAN), a Wide Area Network (WAN), or the Internet. The LAN may use one of several LAN technologies such as, for example, Ethernet, Tokenring, Asynchronous Transfer Mode (ATM), Fiber Distributed Data Interface (FDDI), Copper Distributed Data Interface (CDDI), or JetSend. In an alternative embodiment, the printer 101 and the SS 103 may be coupled via a direct connection. The direct connection may be a wired or a wireless connection; a wired connection may comprise, for example, a twisted pair, a coaxial cable, an optical fiber, etc.; a wireless connection may comprise, for example, infrared (IR) communication signals or radio frequency (RF) communication signals.

Figure 2:
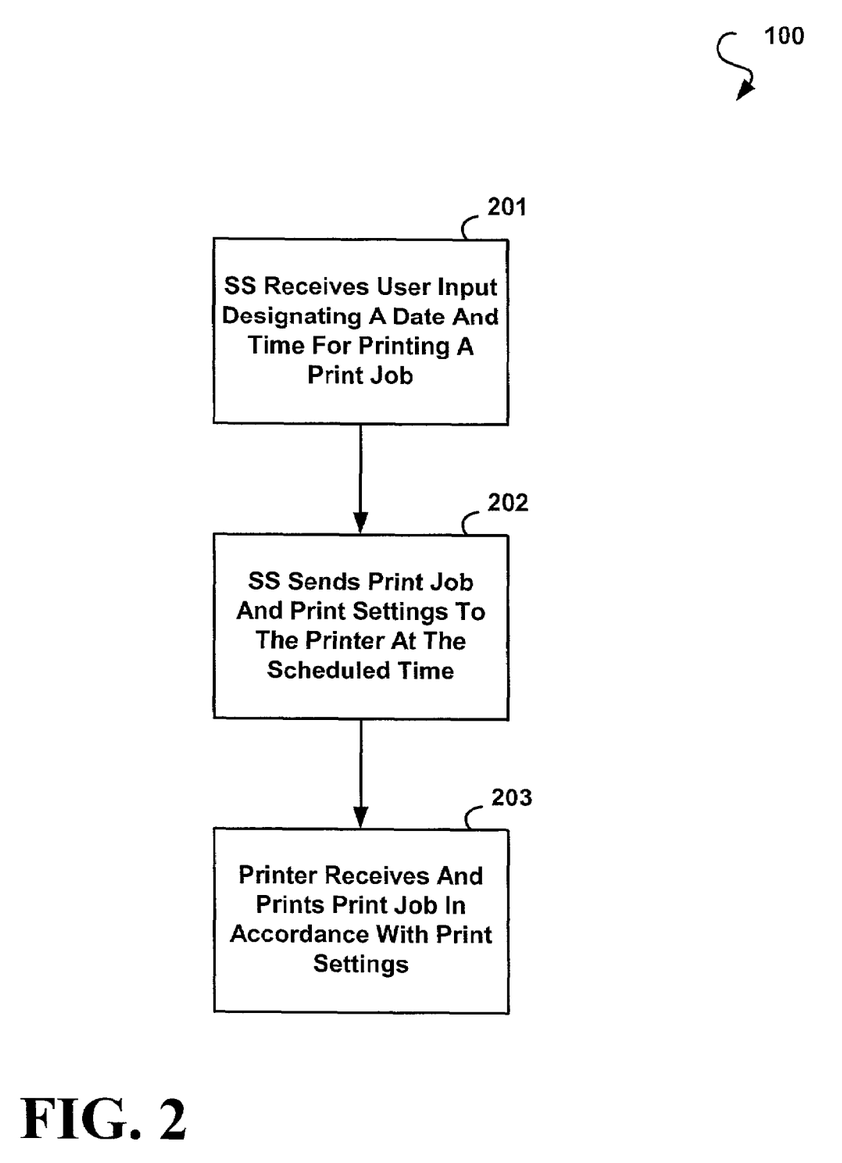
FIG. 2 is a flow chart depicting functionality of the scheduling system depicted in FIG. 1.

With additional reference to FIG. 1 throughout the remaining figures, FIG. 2 is a flow chart depicting functionality of the printing system 100. As indicated in block 201, the SS 103 receives user input designating a date and/or time for printing a print job. In one possible implementation, a user may use the print scheduling screen 600 (FIG. 6) in order to schedule the print job, and the print control screen 500 (FIG. 5) in order to select the printing destination and the print settings for the print job. After receiving the user input, the SS 103 sends the print job and the print settings to the printer 101 at the user-determined time, as indicated in block 202. The print settings may either be default settings or may be determined based on user input. Then, as indicated in block 203, the printer 101 receives the print job and prints it in accordance with the print settings.

Figure 3:
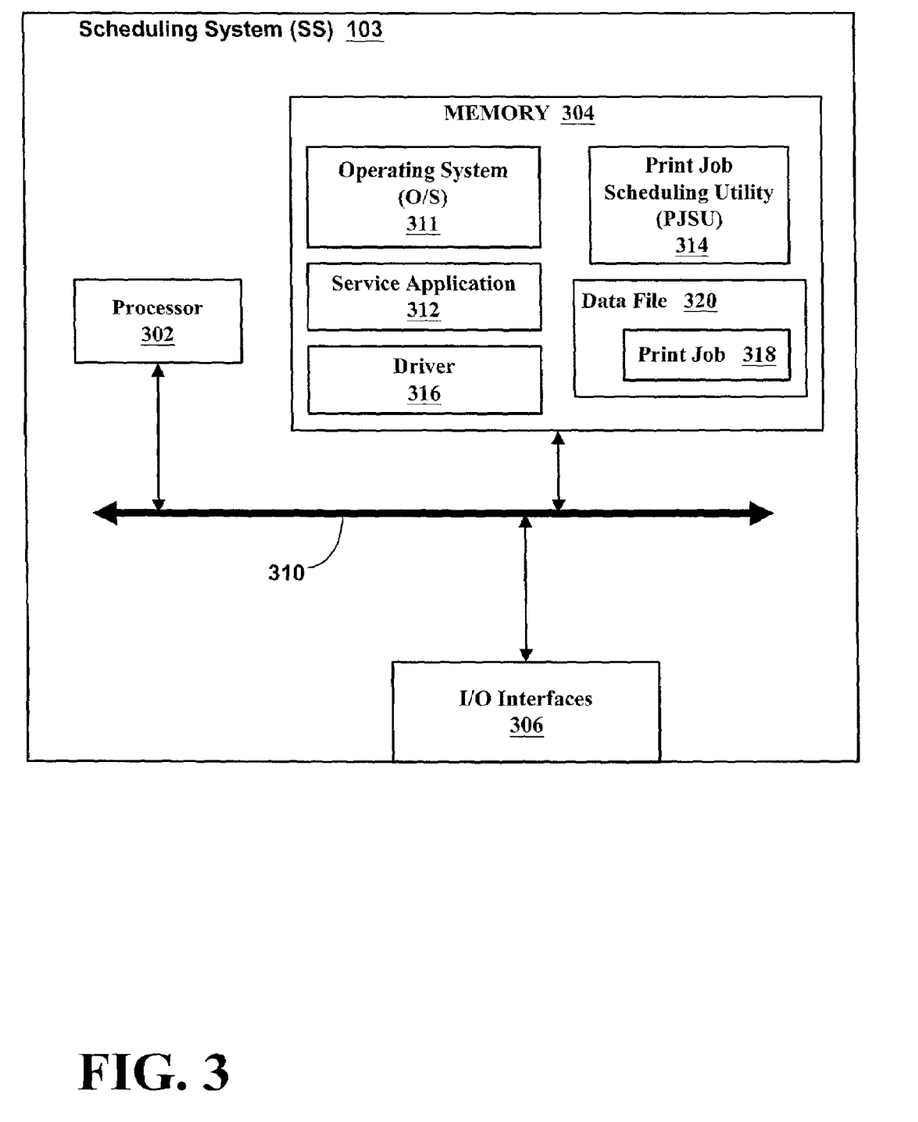
FIG. 3 is a block diagram depicting selected components of the scheduling system depicted in FIG. 1.

FIG. 3 is a block diagram depicting a non-limiting example of a scheduling system (SS) 103 that can be used to schedule the printing of a print job 318. The print job 318 is typically part of a data file 320 and may comprise, for example, word processing data, spreadsheet data, database data, graphical data, or any other printable data. The SS 103 may be a special or general purpose digital computer, such as a personal computer (PC; IBM-compatible, Apple-compatible, or otherwise), a workstation, a minicomputer, or a mainframe computer. Generally, in terms of hardware architecture, as shown in FIG. 3, the SS 103 includes a processor 302, memory 304, and input/output (P/O) interfaces 306. These components (302, 304, and 306) are communicatively coupled via a local interface 310. The local interface 310 can be, for example but not limited to, one or more buses or other wired or wireless connections, as is known in the art. The local interface 310 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 302 is a hardware device for executing software, particularly that stored in memory 304. The processor 302 can be any custom made or commercially available processor, a central processing unit (CPU), an auxiliary processor among several processors associated with the SS 103, a semiconductor based microprocessor (in the form of a microchip or chip set), or generally any device for executing software instructions. Examples of commercially available microprocessors are as follows: a PA-RISC series microprocessor from Hewlett-Packard Company, an 80×86 or Pentium series microprocessor from Intel Corporation, a PowerPC microprocessor from IBM, a Spare microprocessor from Sun Microsystems, Inc, or a 68xxx series microprocessor from Motorola Corporation, etc. When the SS 103 is in operation, the processor 302 is configured to execute software stored within the memory 304, to communicate data to and from the memory 304, and to generally control operations of the SS 103 pursuant to the software.

The I/O interfaces 306 may be used to receive user input and/or to provide system output via one or more devices or components. User input may be provided via, for example, a keyboard and/or a mouse. System output may be provided via a display device and a printer 101. Communication interfaces 306 may include, for example, a serial port, a parallel port, a Small Computer System Interface (SCSI), an IR interface, an RF interface, and/or a universal serial bus (USB) interface.

The memory 304 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 304 may incorporate electronic, magnetic, optical, and/or other types of storage media. Note that the memory 304 can have a distributed architecture, where various components are situated remote from one another, but can be accessed by the processor 302.

The software in memory 304 may include one or more separate programs, each of which comprises an ordered listing of executable instructions for implementing logical functions. In the example of FIG. 3, the software in the memory 304 includes a service application 312, a driver application 316, a print job scheduling utility (PJSU) 314, and a suitable operating system (O/S) 311. The service application 312 may be any type of software application capable of generating printable data, including, for example, a word processing program, a spreadsheet program, a database program, and a graphics design program.

A non-exhaustive list of examples of commercially available operating systems is as follows: (a) a Windows operating system available from Microsoft Corporation; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; and (g) an appliance-based operating system, such as that implemented in handheld computers or personal data assistants (PDAs) (e.g., PalmOS available from Palm Computing, Inc., and Windows CE available from Microsoft Corporation). The operating system 311 essentially controls the execution of other computer programs, such as the service application 312, and provides scheduling, input-output control, file and data management, memory management, and communication control and related services.

If the SS 103 is a PC, workstation, or the like, software in the memory 304 may include a basic input output system (BIOS) (not shown). The BIOS is a set of essential software routines that initialize and test hardware at startup, start the O/S 311, and support the transfer of data among the hardware devices. The BIOS is stored in ROM so that the BIOS can be executed when the SS 103 is activated.

The PJSU 314 may be a source program, an executable program (object code), a script, or any other entity comprising a set of instructions to be performed. When the PJSU 314 is a source program, then the PJSU 314 may be translated via a compiler, assembler, interpreter, or the like, which may or may not be included within the memory 304, so as to operate properly in connection with the O/S 311. Furthermore, the PJSU 314 can be written as (a) an object oriented programming language, which has classes of data and methods, or (b) a procedure programming language, which has routines, subroutines, and/or functions, such as, for example, but not limited to, C, C++, Pascal, Basic, Fortran, Cobol, Perl, Java, and Ada.

When the PSJU 314 is implemented in software, as is shown in FIG. 3, it should be noted that the PSJU 314 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The PSJU 314 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, the PSJU 314 maybe implemented in hardware using, for example, any or a combination of the following technologies which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 4:
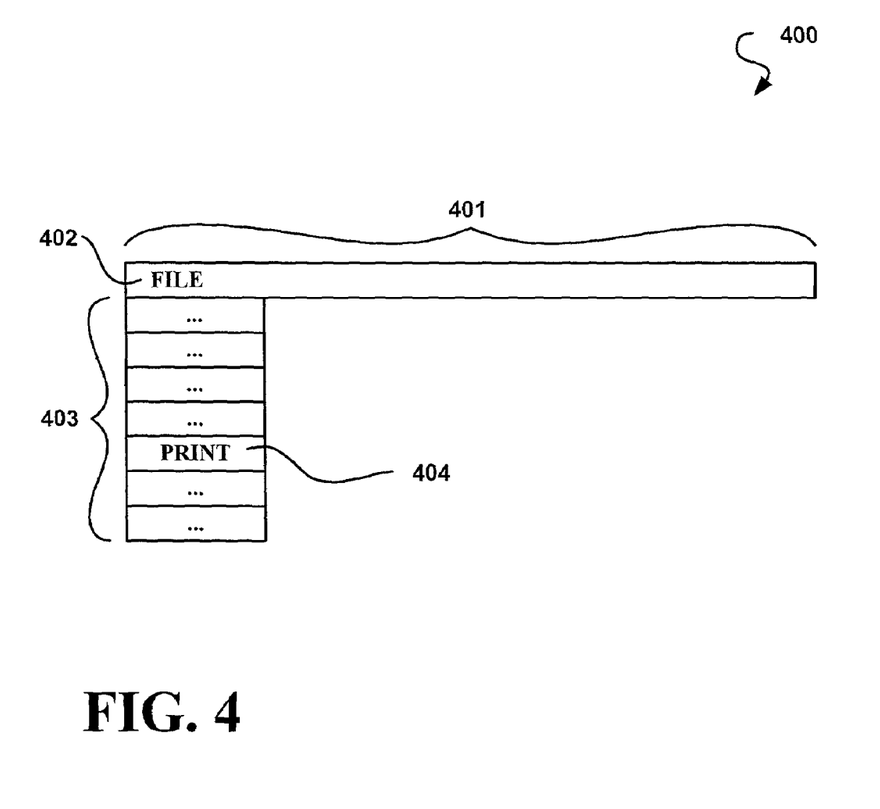
FIG. 4 is a block diagram depicting a menu structure that can be used to request a print control screen from the scheduling system depicted in FIG. 3.
Figure 5:
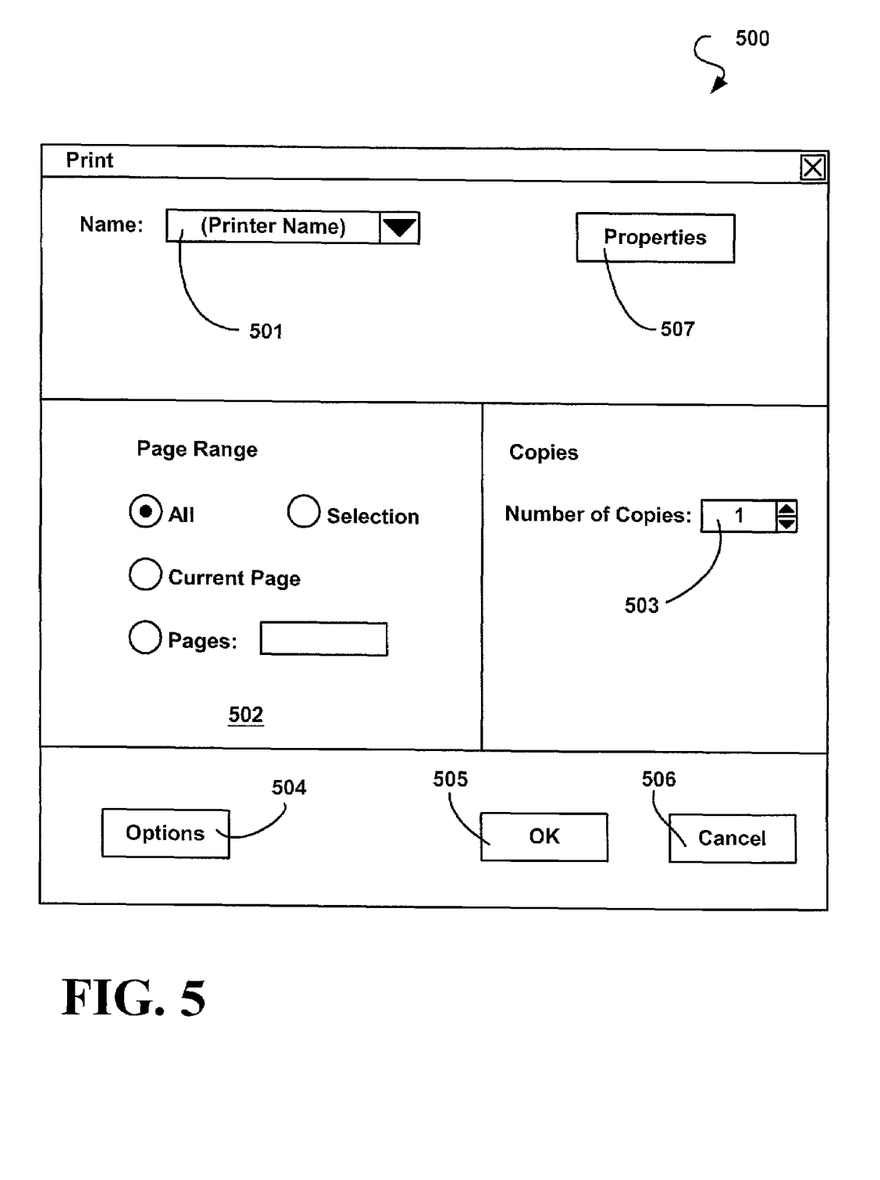
FIG. 5 is a block diagram depicting a print control screen that may be presented by the scheduling system depicted in FIG. 3.

FIG. 4 is a block diagram depicting a non-limiting example of menu structure 400 that can be used to request a print control screen 500 (FIG. 5). Menu structure 400 includes a tool bar 401 and a pull-down menu 403. A user may select file option 402 from tool bar 401 in order to cause pull-down menu 403 to be displayed. The user may then select the print option 404 in order to be presented with the print control screen 500. Each of the options 402 and 404 may be selected via a suitable input device such as, for example, a key-board or a mouse.

FIG. 5 is a block diagram depicting a non-limiting example of a print control screen 500 that can be used to control printing parameters of a print job 318 (FIG. 3). In this example, print control screen 500 includes a print selection field 501, a page range selection section 502, a number of copies selection field 503, an options button 504, an OK button 505, a cancel button 506 and a properties button 507; the printer selection field 501 can be used to select a printing destination; the page range selection section 502 can be used to specify the range of data to be printed; the number of copies selection field 503 can be used to specify the number of copies to be printed; the options button 504 can be used to request a screen containing additional printing options; the OK button 505 can be used to confirm the current printing settings; the cancel button 506 can be used to cancel the printing request; and the properties button 507 can be used to access a print scheduling screen 600 (FIG. 6) for scheduling a print job 318 to be printed at a future time.

Figure 6:
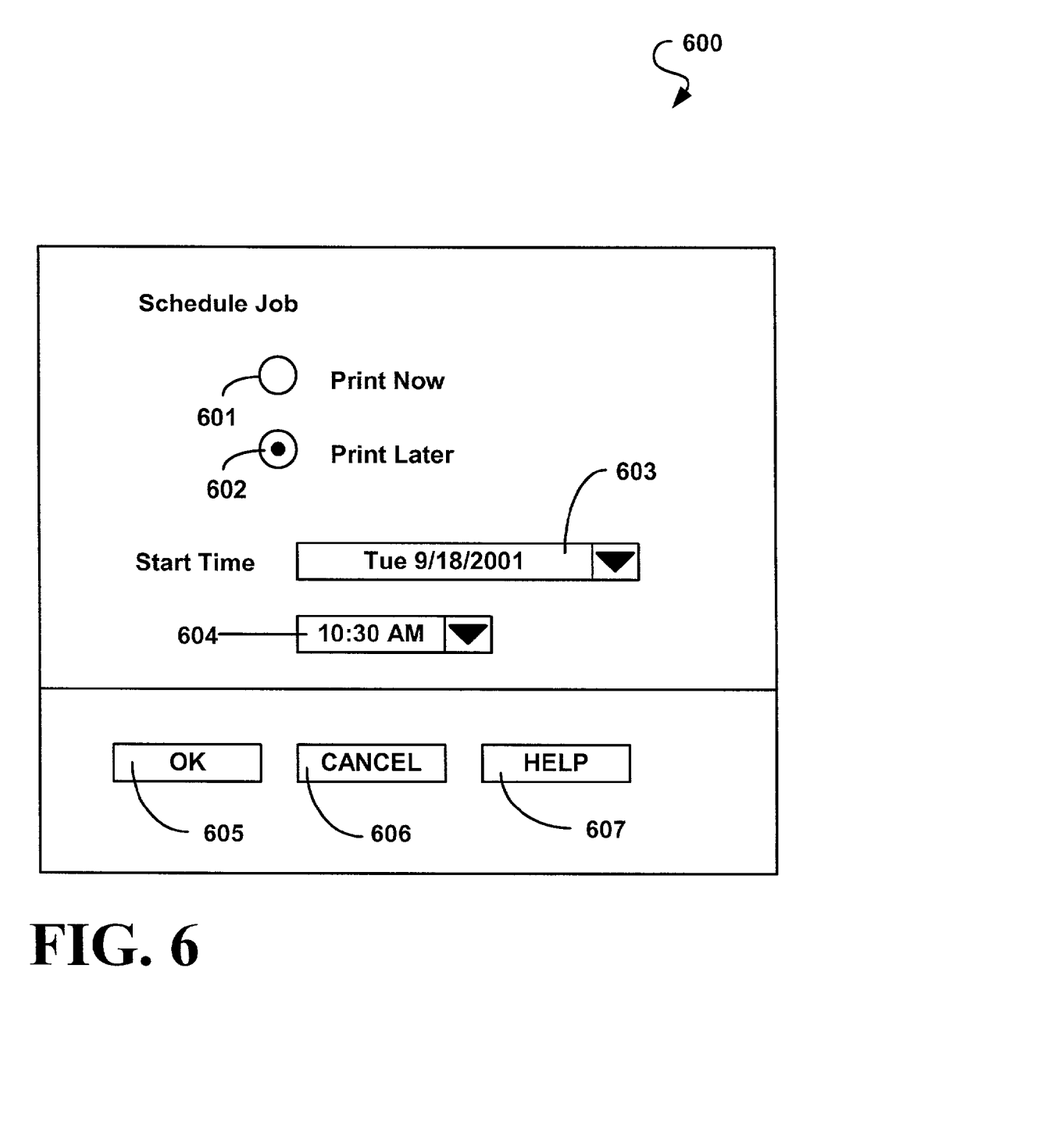
FIG. 6 is a block diagram depicting a non-limiting example of a print scheduling screen that may be presented by the scheduling system depicted in FIG. 3.

FIG. 6 is a block diagram depicting a non-limiting example of a print scheduling screen 600 that can be used to schedule a print job 318 (FIG. 3). The print scheduling screen 600, which may be part of a larger screen for selecting printing properties, includes a "print now" option 601 and a "print later" option 602. The print now option 601 can be selected if the print job 318 is to be transmitted to the printer 101 as soon as the user confirms the printing settings, whereas the print later option 602 can be selected if the print job 318 is to be transmitted to the printer 101 at a scheduled time that is determined by user input. The date field 603 and time field 604 may be used to specify the date and time, respectively, that the print job 318 is to be transmitted to the printer 101. The OK button 605 can be used to confirm selections made via the print scheduling screen 600, whereas the cancel button 606 can be used to cancel such selections. The help button 607 can be used to request helpful information related to scheduling a print job 318.

Figure 7:
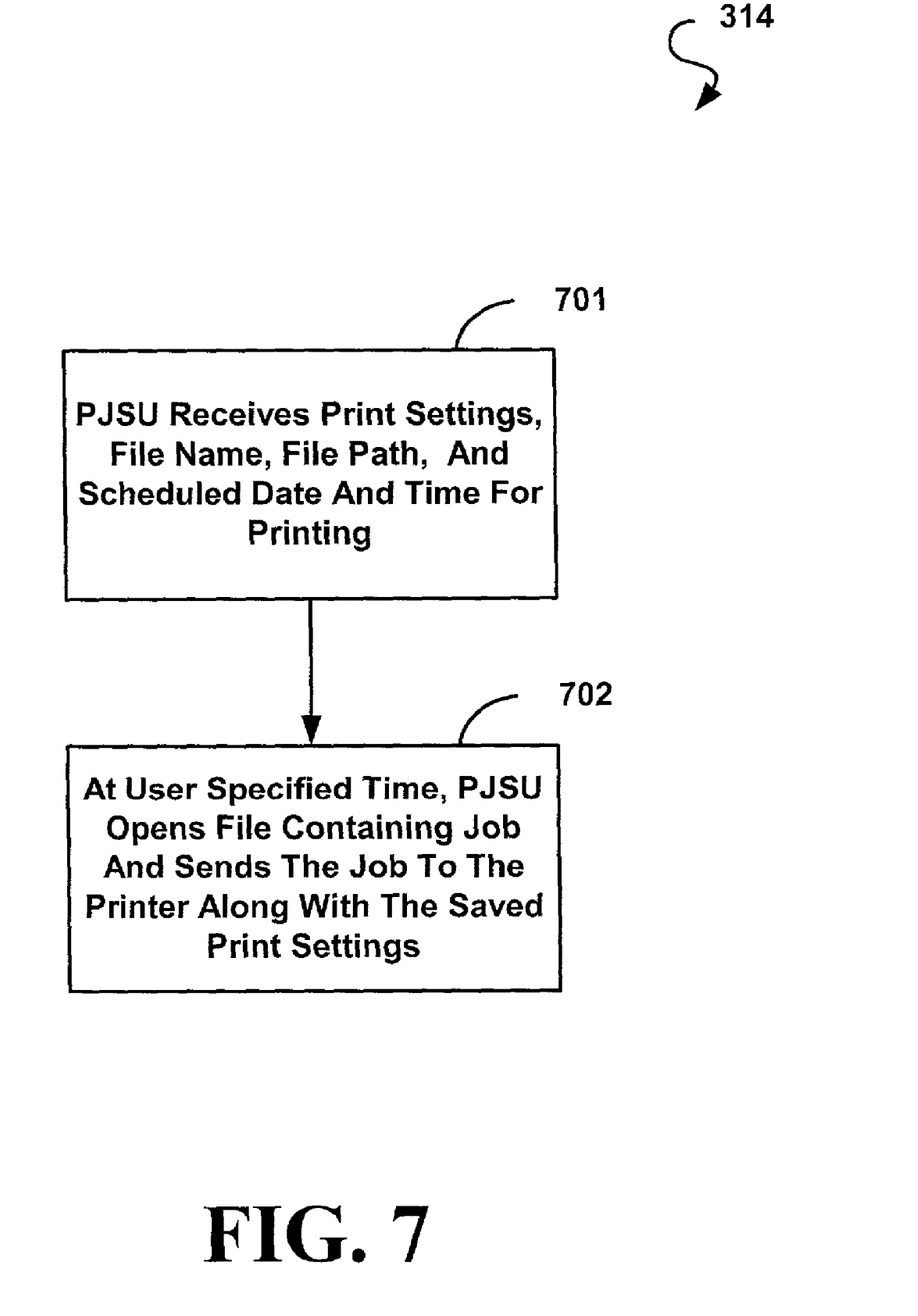
FIG. 7 is a flow chart depicting steps taken by a print job scheduling utility (PJSU) depicted in FIG. 3.

FIG. 7 is a flow chart depicting functionality of the PJSU 314 (FIG. 3) in accordance with one embodiment of the invention. As indicated in block 701, the PJSU 314 receives data identifying the print settings, the file name, the file path, and the scheduled printing time corresponding to the print job 318 (FIG. 3). The PJSU 314 may receive this data from the driver application 316 (FIG. 3) or may alternatively retrieve it from memory 304 (FIG. 3). When the scheduled printing time arrives, the PJSU 314 opens the file containing the print job 318 and transmits the print job 318 to the printer 101 along with the corresponding print settings, as indicated in block 702.

Figure 8A:
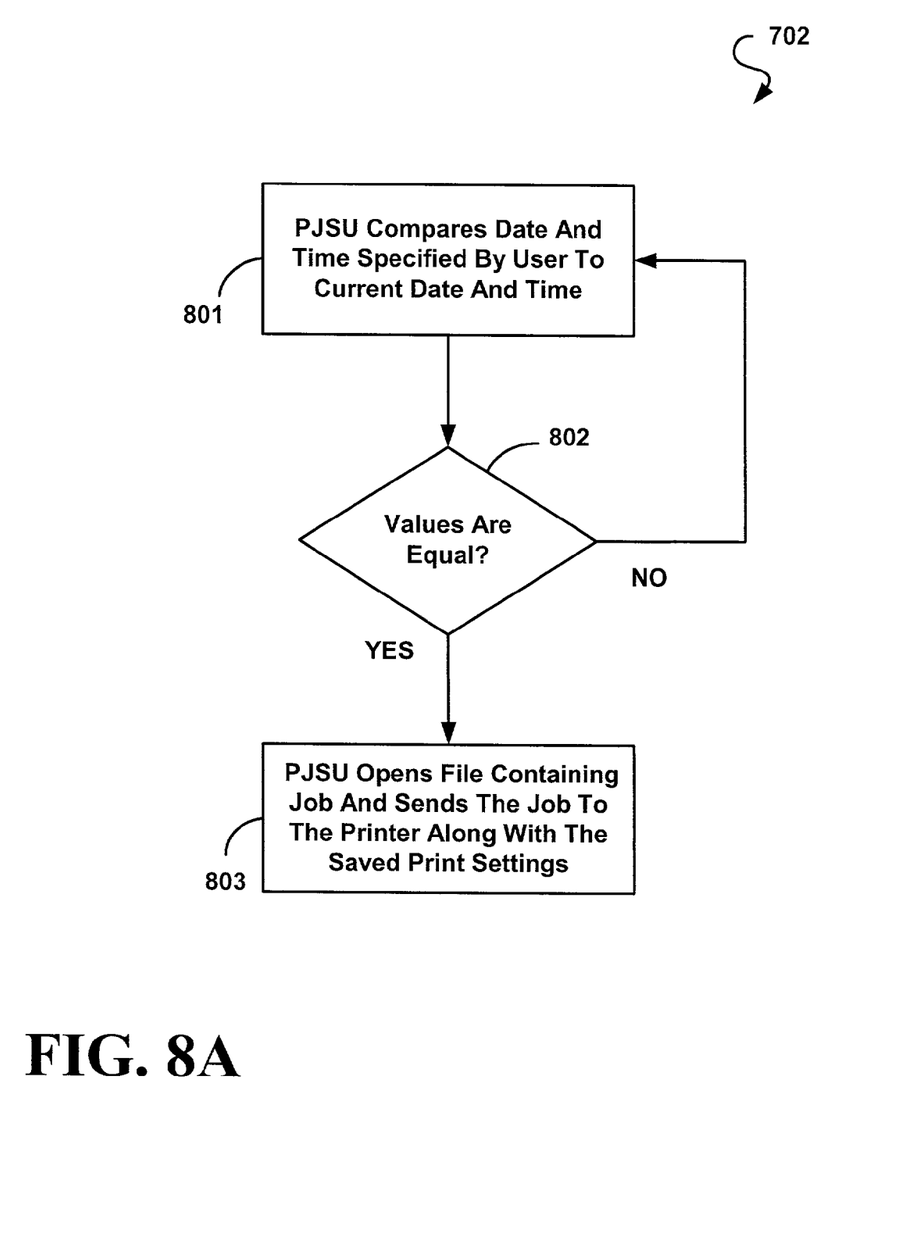
FIG. 8A is a flow chart depicting a routine that may be used to implement steps depicted in FIG. 7.

FIG. 8A is a flow chart depicting a non-limiting example of a routine that can be used to implement steps corresponding to block 702 depicted in FIG. 7. In step 801, the PJSU 314 (FIG. 3) compares a value corresponding to the date and time specified by the user to a value corresponding to the current date and time. The PJSU 314 then determines in step 802 if the two values are equal. If the two values are not equal, then the PJSU 314 returns to step 801. However, if the two values are equal, then the PJSU 314 opens the file containing the print job 318 (FIG. 3), and sends the print job 318 and the corresponding print settings to the printer 101. A person of ordinary skill in the art will appreciate that alternative approaches can be used to trigger the transmission of the print job 318 to the printer 101. One such alternative approach is illustrated in FIG. 8B.

Figure 8B:
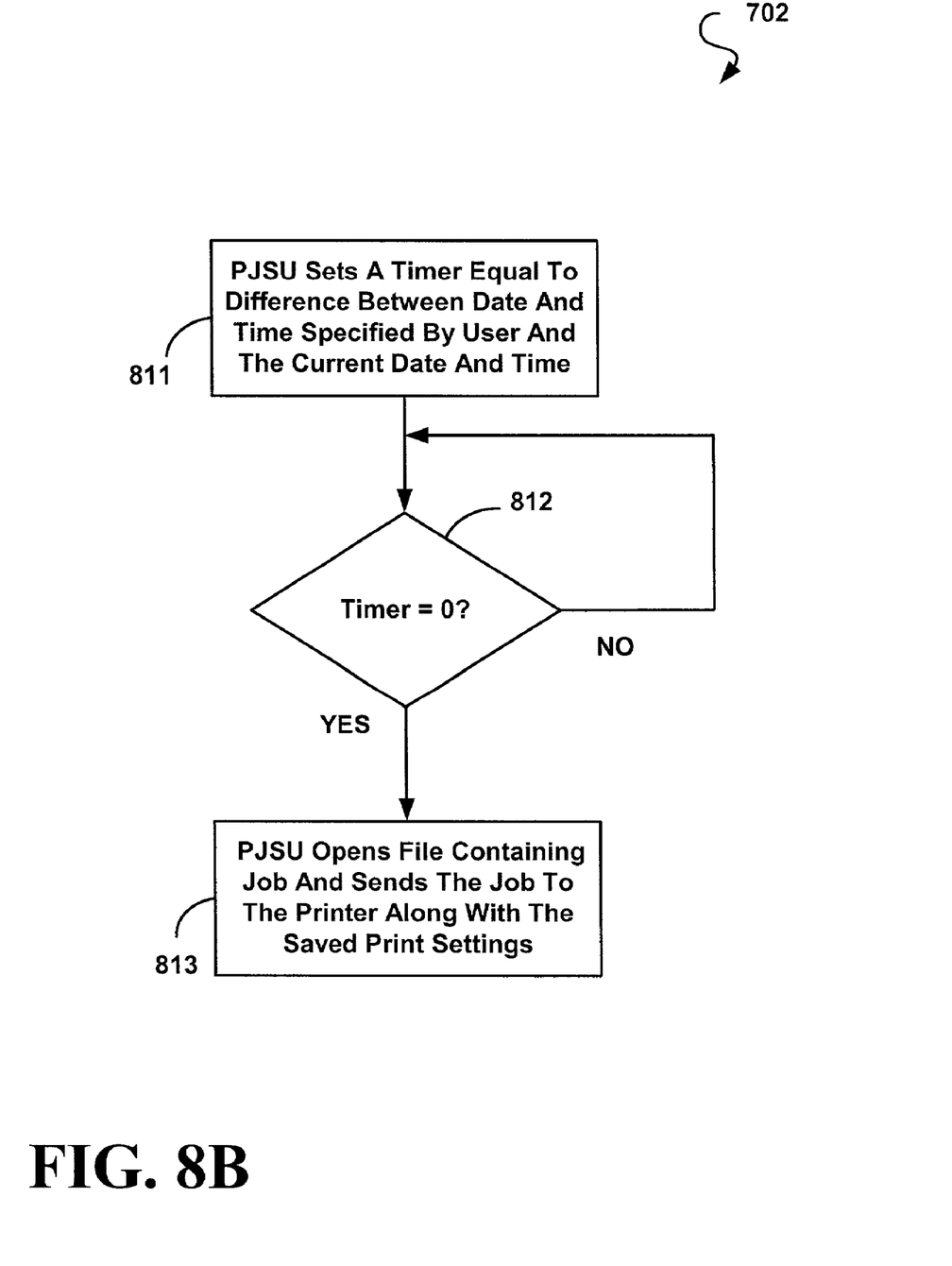
FIG. 8B is a flow chart depicting a routine that is an alternative embodiment to the routine depicted in FIG. 8A.

FIG. 8B is a flow chart depicting a non-limiting example of a routine that is an alternative embodiment to the routine depicted in FIG. 8A. In step 811, the PJSU 314 (FIG. 3) sets a timer using a value representing the difference between the date and time specified by the user and the date and time corresponding to a current date and time. The PJSU 314 then determines in step 812 if timer value is equal to zero. If the timer value is not equal to zero, then the PJSU 314 repeats step 812. However, if the timer value is equal to zero, then the PJSU 314 in step 813 opens the file containing the print job 318 (FIG. 3), and sends the print job 318 and the corresponding print settings to the printer 101.

It should also be emphasized that the above-described embodiments of the invention, particularly any "preferred embodiments", are merely possible examples, among others, of the implementations, setting forth a clear understanding of the principles of the invention. Many variations and modifications may be made to the above-described embodiments of the invention without departing substantially from the principles of the invention. All such modifications and variations are intended to be included herein within the scope of the disclosure and present invention and protected by the following claims.

Therefore, having thus described the invention, the following is claimed:

1. A method comprising:
   in response to a user requesting, via a user interface, to print information on a printing device, the information related to just one print job,
      displaying a print window in which the user is permitted to modify printing parameters controlling printing of the information on the printing device, the print window related to just the one print job, the user permitted to modify the printing parameters directly on the print window without any other window having to be displayed;

in response to a user selecting a button on the print window, displaying a job schedule window in which the user is permitted to specify a later time and/or date at which a print job is transmitted to the printing device, the print job encompassing the information to be printed on the printing device in accordance with the printing parameters, the job schedule window being different than the print window, the job schedule window being displayed separately from the print window such that there is no common window encompassing both the job schedule window and the print window;

in response to the user specifying the later time and/or date at which the print job is transmitted to the printing device, scheduling transmission of the print job to the printing device at the later time and/or date; and, at the later time and/or date, transmitting the print job to the printing device for printing of the information on the printing device in accordance with the printing parameters.

2. The method of claim 1, further comprising the user modifying one or more of the printing parameters controlling printing of the information on the printing device, such that the print job is printed on the printing device at the later time and/or date in accordance with the printing parameters as modified by the user, the printing parameters including one or more of a page range of the print job, and a number of copies of the print job.

3. The method of claim 1, wherein the printing parameters specifiable by the user include identification of the printing device that is to print the information.

4. The method of claim 1, wherein the user requests, via the user interface, to print the information on the printing device by selecting a print menu item within a file menu of the user interface, the file menu labeled with a label entitled 'file'.

5. The method of claim 1, wherein the user selects the button on the print window by selecting a properties button, the properties button labeled with a label entitled 'properties'.

6. The method of claim 1, wherein displaying the job schedule window comprises displaying the job schedule window as including a "print now" option selectable by the user and a "print later" option selectable by the user, such that the user selecting the "print later" option enables the user to specify the later time and/or date at which the print job is transmitted to the printing device.

7. The method of claim 1, wherein the method is performed by a computing device communicatively connected to the printing device, such that the print job is stored at the computing device until the later time and/or date specified by the user, at which time and/or date the print job is transmitted to the printing device from the computing device.

8. The method of claim 1, wherein the print job comprises at least one of spreadsheet data, and database data.

9. The method of claim 1, wherein the printing device is one of a laser printer, an ink-jet printer, an impact printer, a solid-ink printer, and a multifunction device.

10. A print scheduling system comprising:

a user interface operative on a user work station for displaying a plurality of windows in response to a user requesting to print information on a printing device, the windows permitting modification of printing parameters controlling printing of the information on the printing device, the information related to just one print job, the windows further permitting the user to specify whether the information is to be printed on the printing device in accordance with the printing parameters now or at a later time and/or date specifiable by the user, the plurality of windows including a job schedule window and a print window, the job schedule window being displayed separately from the print window such that there is no common window encompassing both the job schedule window and the print window, the print window related to just the one print job, the user permitted to modify the printing parameters directly on the print window without any other window having to be displayed; and, a processor of the workstation that is programmed to initiate transmission of a print job from the user workstation to the printing device based on whether the user specified that the information is to be printed on the printing device now or at the later time and/or date, such that where the user has specified that the information is to be printed on the printing device at the later time and/or date, the print job is transmitted to the printing device at the later time and/or date, the print job encompassing the information to be printed on the printing device in accordance with the printing parameters.

11. The print scheduling system of claim 10, wherein the printing parameters specifiable by the user include identification of the printing device that is to print the information.

12. The print scheduling system of claim 10, wherein the user interface displays the windows in response to the user requesting to print the information on the printing device by selecting a print menu item within a file menu of the user interface, the file menu labeled with a label entitled 'file'.

13. The print scheduling system of claim 10, wherein the user interface displays a first window including a button selectable by the user, such that selection of the button by the user causes the user interface to display a second window in which the user is permitted to specify whether the information is to be printed now or at the later time and/or date.

14. The print scheduling system of claim 10, wherein the print job comprises at least one of spreadsheet data, and database data.

15. The print scheduling system of claim 10, wherein the printing device is one of a laser printer, an ink-jet printer, an impact printer, a solid-ink printer, and a multifunction device.

16. A print scheduling system comprising:

means for displaying a plurality of windows in response to a user requesting to print information on a printing device, the windows permitting modification of printing parameters controlling printing of the information on the printing device, the information related to just one print job, the windows further permitting the user to specify whether the information is to be printed on the printing device in accordance with the printing parameters now or at a later time and/or date specifiable by the user, the plurality of windows including a job schedule window and a print window, the job schedule window being displayed separately from the print window such that there is no common window encompassing both the job schedule window and the print window, the print window related to just the one print job, the user permitted to modify the printing parameters directly on the print window without any other window having to be displayed; and, means for initiating transmission of a print job to the printing device based on whether the user specified that the information is to be printed on the printing device now or at the later time and/or date, such that where the user has specified that the information is to be printed on the printing device at the later time and/or date, the print job is transmitted to the printing device at the later time and/or date, the print job encompassing the information to be printed on the printing device in accordance with the printing parameters.

17. The print scheduling system of claim 16, wherein a first window including a button selectable by the user is displayed by the means for displaying, such that selection of the button by the user causes the means for displaying to display a second window in which the user is permitted to specify whether the information is to be printed now or at the later time and/or date.

18. The print scheduling system of claim 16, wherein the printing device is one of a laser printer, an ink-jet printer, an impact printer, a solid-ink printer, and a multifunction device.

19. A computer readable medium having a computer program stored thereon to perform a method comprising:
in response to a user requesting, via a user interface, to print information on a printing device, the information related to just one print job,
displaying a print window in which the user is permitted to modify printing parameters controlling printing of the information on the printing device, the print window related to just the one print job, the user permitted to modify the printing parameters directly on the print window without any other window having to be displayed;
in response to a user selecting a button on the print window,
displaying a job schedule window in which the user is permitted to specify a later time and/or date at which a print job is transmitted to the printing device, the print job encompassing the information to be printed on the printing device in accordance with the printing parameters, the job schedule window being different than the print window, the job schedule window being displayed separately from the print window such that there is no common window encompassing both the job schedule window and the print window;
in response to the user specifying the later time and/or date at which the print job is transmitted to the printing device,
scheduling transmission of the print job to the printing device at the later time and/or date; and,
at the later time and/or date, transmitting the print job to the printing device for printing of the information on the printing device in accordance with the printing parameters.

20. The computer readable medium of claim 19, wherein displaying the job schedule window comprises displaying the job schedule window as including a "print now" option selectable by the user and a "print later" option selectable by the user, such that the user selecting the "print later" option enables the user to specify the later time and/or date at which the print job is transmitted to the printing device.

21. The computer readable medium of claim 19, wherein the method is performed by the computer program as executed on a computing device communicatively connected to the printing device, such that the print job is stored at the computing device until the later time and/or date specified by the user, at which time and/or date the print job is transmitted to the printing device from the computing device.

* * * * *

UNITED STATES PATENT AND TRADEMARK OFFICE
CERTIFICATE OF CORRECTION

PATENT NO. : 7,385,720 B2  Page 1 of 1
APPLICATION NO. : 10/010641
DATED : June 10, 2008
INVENTOR(S) : Kristen L. Bhatti It is certified that error appears in the above-identified patent and that said Letters Patent is hereby corrected as shown below:

In column 3, line 21, delete "(P/O)" and insert -- (I/O) --, therefor.

In column 3, line 43, delete "Spare" and insert -- Sparc --, therefor.

In column 7, line 35, in Claim 2, delete "of" and insert -- of: --, therefor.

In column 8, line 64, in Claim 16, delete "ajob" and insert -- a job --, therefor.

Signed and Sealed this

Eleventh Day of August, 2009

David J. Kappos
*Director of the United States Patent and Trademark Office*